(No Model.)
J. L. RAY.
SLED PROPELLER.
No. 247,686. Patented Sept. 27, 1881.
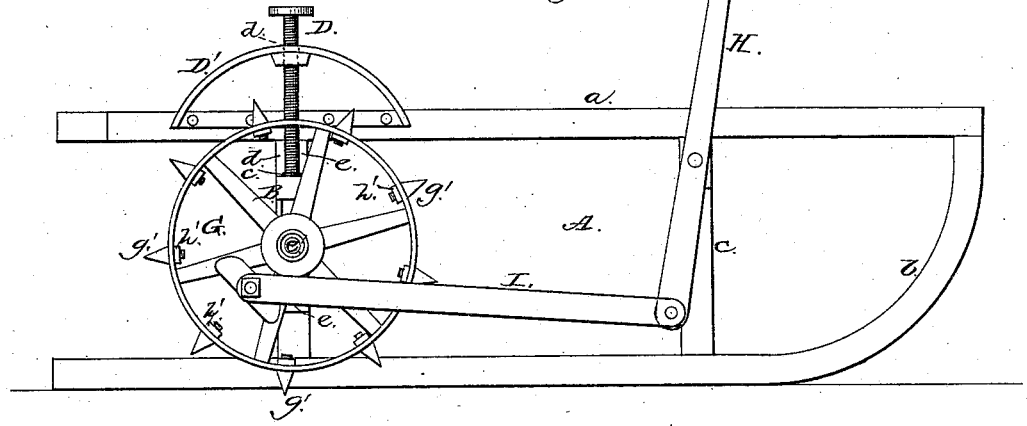
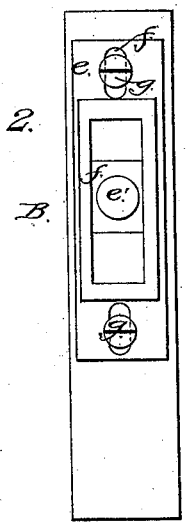
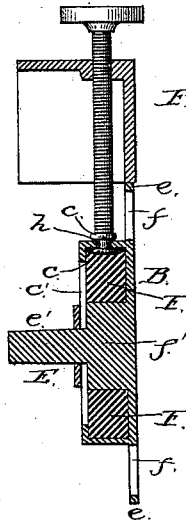
WITNESSES
INVENTOR
Jno. L. Ray,
by Anderson & Smith
his ATTORNEYS

UNITED STATES PATENT OFFICE.

JOHN L. RAY, OF CHAMPAIGN, ILLINOIS.

SLED-PROPELLER.

SPECIFICATION forming part of Letters Patent No. 247,686, dated September 27, 1881.

Application filed March 14, 1881. (No model.)

*To all whom it may concern:*

Be it known that I, JOHN L. RAY, of Champaign, in the county of Champaign and State of Illinois, have invented a new and valuable Improvement in Sled-Propellers; and I do hereby declare that the following is a full, clear, and exact description of the construction and operation of the same, reference being had to the annexed drawings, making part of this specification, and to the letters and figures of reference marked thereon.

Figure 1 is a representation of a side view; and Figs. 2 and 3 are detail views.

This invention relates to improvements in sled-propellers.

The invention consists in a sled provided with the devices hereinafter set forth, and particularly pointed out in the claim.

In the annexed drawings, A is a sled having the ordinary seat-board, $a$, runners $b\ b$, legs $c$ and $d$. Attached to the outside of hind legs, $d\ d$, are the boxes B B. At its ends the box B has the flanges $e$ slotted at $f$, through which slots pass screws $g$, by which the box is held to the leg, but not tightly.

D is a screw-bolt passing through the upper end of box B, having a collar, $c\ c'$, inside and outside of said box and plain where it passes through hole $h$. The upper end of this bolt passes through a wheel-fender, D', the hole of which is threaded to correspond with the bolt D, or a nut is made fast to the fender beneath. On its end the bolt D has a button, crank, or other device for turning.

E is a spindle for a wheel, having tapering journal $e'$ and angular extension $f'$. This extension is seated in the box B, the flanges $b'$ of the latter being turned over the edges of the former, the journal $e'$ protruding through the slot $c'$. Above and below this extension $f'$ are placed, in the box B, pieces of rubber F F or other springs.

Journaled in journal $e'$ is a wheel, G, having its periphery supplied with spikes $g'$, which project therethrough, and are held by nuts $h'$. This wheel is held in place by washers and a nut.

H are levers pivoted to the sled at the front on each side, and connected at their lower ends with the wheels by the pitmen I I. By operating these levers the wheels are turned, and as the spikes stick in the snow and ice the sled is driven.

The bolts D adjust the heights of the wheels, so as to give the spikes the varying depths, according to the character of the surface.

I claim—

The combination of spiked wheel G, box B, fender D', having threaded hole and bolt D, substantially as specified.

In testimony that I claim the above I have hereunto subscribed my name in the presence of two witnesses.

JOHN L. RAY.

Witnesses:
BENJAMIN HOLBROOK,
JONATHAN B. GREEN.